United States Patent [19]

Vorobyov

[11] Patent Number: 4,464,078
[45] Date of Patent: Aug. 7, 1984

[54] LOCKING MECHANISM FOR TELESCOPED POLES

[75] Inventor: Michael Vorobyov, Brooklyn, N.Y.

[73] Assignee: Unger Enterprises, Inc., Mount Vernon, N.Y.

[21] Appl. No.: 542,342

[22] Filed: Oct. 17, 1983

[51] Int. Cl.³ .......................... B25G 3/00; F16D 1/00
[52] U.S. Cl. ...................................... 403/351; 74/531
[58] Field of Search ................. 403/351, 350; 74/531; 192/55, 54; 464/37

[56] References Cited

U.S. PATENT DOCUMENTS

| | | | |
|---|---|---|---|
| 2,960,852 | 11/1960 | Schroter et al. | 464/37 X |
| 2,992,026 | 7/1961 | Farber | 403/351 |
| 3,454,002 | 7/1969 | Westlake et al. | 403/351 X |
| 3,762,058 | 10/1973 | Heater | 403/104 X |

*Primary Examiner*—Andrew V. Kundrat
*Attorney, Agent, or Firm*—Abelman Frayne Rezac & Schwab

[57] ABSTRACT

A locking mechanism for telescoped poles includes an eccentric cam and a roller which becomes trapped behind axially extending ribs formed on the interior of the outermost pole or on the exterior of the eccentric cam to enhance the resistance of the locking mechanism to unintended unlocking movement.

8 Claims, 6 Drawing Figures

LOCKING MECHANISM FOR TELESCOPED POLES

FIELD OF THE INVENTION

This invention relates to a locking mechanism for telescoped poles, which finds particular application in telescoped extension poles used by window cleaners or painters, or for the cleaning or sweeping of swimming pools, and the like. The invention also finds application in telescoped poles employed, for example, in camera or lighting tripods, for the support of display shelving or platforms, or, in any other application in which it is required that the combined lengths of the telescoped poles be quickly and easily adjusted, and that the telescoped poles then be securely locked in their adjusted position.

THE PRIOR ART

A locking mechanism commonly employed in such applications is one provided by forming the end of the outermost pole of a pair of telescoped poles as a collet chuck, which is clamped onto an inner pole by a camming ring threaded onto the end of the outer pole. Such an arrangement is somewhat cumbersome and slow to operate in that the user must employ both hands for operating the locking mechanism, during which time the inner pole is free to slip relative to the outer pole.

Another locking mechanism commonly employed in such applications includes a spring-loaded pin carried by the outer pole and which is biased into one of a series of longitudinally spaced holes formed in the inner pole. This construction limits the axial adjustment of the poles to intervals corresponding with the spacing of the holes provided in the inner pole and requires selective manipulation by the user to properly align the pins to the holes.

U.S. Pat. No. 2,517,700, Odin, issued Aug. 8, 1950, discloses a locking mechanism for telescoped poles which employs an eccentric cam and roller arrangement carried by the inner pole. Relative rotation between the inner and outer poles in one direction causes the roller to ride up the cam surface and jam, thus locking the poles in their adjusted position. The poles can be manually adjusted to any required length, and then be locked in that position without risk of one of the poles slipping relative to the other. While this arrangement performs satisfactory under axial loading of the poles, it is less than satisfactory under torsional loading, in that torsional loading in one direction can result in the undesired unlocking of the mechanism and the collapse of the poles during use.

THE INVENTIVE CONCEPT

The present invention overcomes the problems in prior devices. In particular, the present invention eliminates the need of spring load pins, yet significantly increases the resistance of the poles to unlocking movement when subjected to torsional loading in the unlocking direction.

According to the present invention, the inner pole includes an eccentric cam and roller arrangement and the outer pole of the pair of poles is provided internally with radially inwardly extending flutes or ribs, which provide positive abutments or stops for the roller militating against unlocking movement of the locking mechanism under torsional loading. Alternatively, the eccentric cam is provided with radially outwardly extending flutes or ribs, or, both the outer pole and the eccentric cam are provided with flutes or ribs to militate against such unlocking movement.

At least one of the outer pole or the eccentric cam or the roller is formed of a resilient material having a high resistance of deformation, in order to permit movement of the roller to the locked position. Preferably, the required resilience is provided by forming the outer pole of a springy material and slightly oversized such that it can flex to a limited extent and move out of round, or, by forming the roller or the eccentric cam of a stiff but resilient material having a memory of its original shape. Extruded or drawn seam welded aluminum tubing is a preferred material for the outer pole, and nylon is a preferred material for the roller and the eccentric cam.

DESCRIPTION OF THE DRAWINGS

The invention will now be described with reference to the accompanying drawings which illustrate preferred embodiments of the present invention, and in which.

DESCRIPTION OF THE PREFERRED EMBODIMENTS

Figure 1:
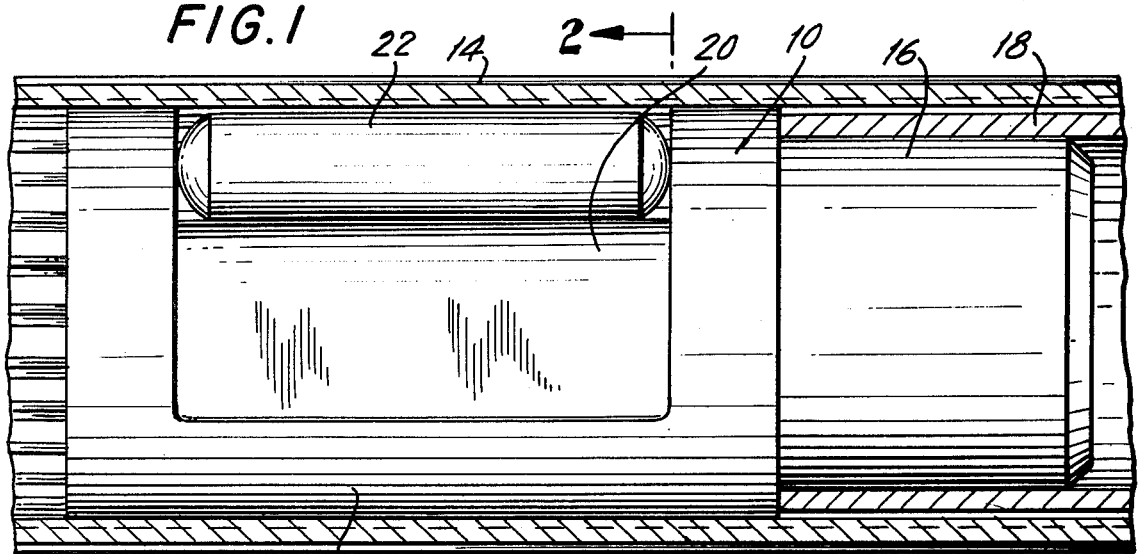
FIG. 1 is an enlarged longitudinal cross-section through a pair of telescoped poles and illustrating the locking mechanism of the present invention in-situ.

Referring now to the drawings, FIG. 1 illustrates a locking mechanism according to the present invention, the locking mechanism being illustrated generally at 10, and including a cylindrical portion 12 which is a free sliding fit within an outer tubular pole 14, the locking mechanism including a cylindrical en portion 16 which is a force fit or otherwise secured within the end of an inner pole 18.

The cylindrical portion 12 of the locking mechanism is undercut intermediate its ends to provide an eccentric cam surface 20 having a slow rise, on which rides a roller 22. The roller 22 has a diameter slightly less than the spacing between the minimum rise of the cam and the inner wall of the outer pole 14, such that, when in the unlocked position, the respective poles can be freely slid axially relative to each other.

Figure 2:
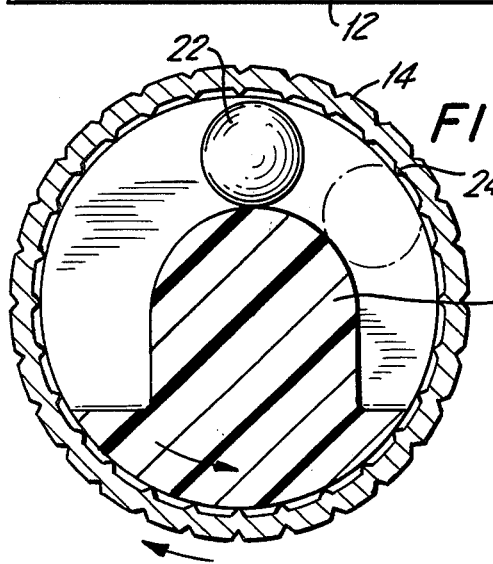
FIG. 2 is a transverse cross-section through the locking mechanism of FIG. 1.
Figure 3:
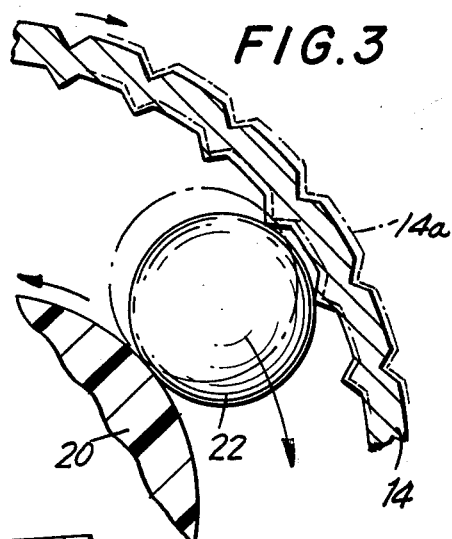
FIG. 3 is an enlarged fragmentary portion of FIG. 2.

As shown in FIG. 2, the eccentric cam 20 preferably is a single rise cam. Alternatively, and as shown in FIG. 3, the cam is symmetrical on both sides of its minimum rise, in order that the locking mechanism may be operated with equal facility by relative rotation of the poles in either direction.

The rise of the eccentric cam 20 is such that upon rotation of the respective poles relative to each other in the appropriate direction, the roller 20 is caused to ride up the rise of the eccentric cam, and utlimately become wedged between the eccentric cam and the inner surface of the outer pole 14.

To provide a locking mechanism for telescoped poles with an enhanced resistance to unintended unlocking of the locking mechanism when the poles are subjected to torsional loading and as more clearly appears in FIGS.

2 and 3, the outer pole 14 is internally axially ribbed to provide substantially parallel, circumferentially spaced, radially inwardly extending abutments 24. The outer pole 14 preferably is formed such that it is somewhat resilient and springy and is capable of distorting slightly out of round when subjected to radially outwardly directed forces acting on the inner surface thereof. In this manner, upon relative rotation of the poles in the appropriate locking direction, the roller 22 is caused to ride up the rise of the eccentric cam 20 and to progressively ride over the radially inwardly extending ribs on the inner surface of the outer pole 14. The ribs also act to move and maintain the roller in parallelism with the ribs.

When a torsional force is applied to the poles in the locking direction of relative rotation, then, the roller 22 will move further up the rise of the eccentric cam 20, ad in so doing will force the outer pole 14 into a slightly out-of-round or elliptical condition, as indicated in dotted lines at 14a in FIG. 3, thus permitting the roller 22 to pass under the rib with which it is engaged, and then to become trapped behind that rib and be held thereby against reverse movement. The ribs thus act somewhat in the manner of click-stops. As the relative rotational forces on the poles is further increased, the roller 22 progressively passes over the next adjacent rib and becomes trapped behind that rib as shown in FIG. 3. As the roller 22 progresses across the ribs, it produces a reaction force on the eccentric cam 20 to force the cylindrical portion 12 of the locking mechanism into clamping engagement with the inner periphery of the outer pole 14 at a position diametrically opposite the roller 22. Ultimately, the roller will reach a final position determined by the torsional force which has been applied to the respective poles 14 and 18, at which point the poles will be held securely locked to each other.

The reaction force provided by the roller 22 produces a further beneficial effect militating against unlocking movement of the locking mechanism under torsional loading. In the event that the cylindrical portion 12 is formed from a resilient plastics material, as is preferred, then, the ribs 24 in the zone X diametrically opposite the roller 22 in the locked position of the mechanism will act to indent the plastics material and become partially embedded therein to restrain relative sliding and rotational movement between the outer pole 14 and the cylindrical member 12. Any wear that occurs on the cylindrical member 12 in the location by the ribs as a result of this action is of little consequence, in that it will only result in the roller riding slightly higher up the rise of the ramp cam 20.

If torsional force is applied to the poles in the direction of locking of the locking mechanism, then, the locking mechanism will attempt to lock further. If, however, the torsional force is in the opposite direction, then, the locking mechanism will attempt to unlock. Torsional forces in the unlocking direction are resisted by the wedging action of the roller 22 between the eccentric cam 20 and the inner surface of the outer pole 14, and are also resisted by the engagement of the roller 22 behind the adjacent rib on the inner surface of the outer pole 14. The roller 22 is thus restrained against rolling movement relative to the eccentric cam 20 and the outer pole 14, and remains frictionally engaged with those members. In this way, a significant increase is obtained in the resistance of the locking mechanism to unlocking movement under reverse torsional loading, in that the roller is frictionally engaged with the surface of the eccentric ramp cam, and must first ride over the rib by which it is held before the frictional engagement is released and rolling movement and unlocking of the mechanism can occur. Additionally, the ribs themselves provide a positive restraint against relative rotational movement between the outer pole and the eccentric cam.

In FIG. 2 the outer pole 14 is shown as being ribbed both internally and externally. the ribbing can be accomplished in an suitable manner, such as by extruding a tube through an appropriate die, such as might be the case of an outer pole 14 which is formed from aluminum or any other readily extrudable material, or, by passing the tube through an appropriate forming die, such as might be the case of an outer pole 14 which is a drawn or seam welded tube formed from steel, stainless steel, or other suitable material.

While the cylindrical portion 12 of the locking mechanism 10 and its roller 22 can be formed from metal, preferably they are formed from a hard but slightly resilient plastics material, such as nylon. This provides further resilience in the locking mechanism and the production of an even greater locking force, nylon being inherently capable of deforming to a limited extent to further the locking operation, and, being inherently capable of substantially recovering its returning original shape on unlocking of the mechanism.

Figure 4:
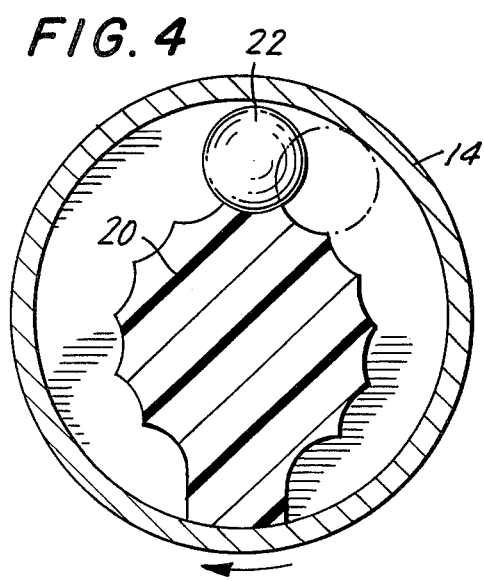
FIG. 4 is a transverse cross-section corresponding with FIG. 2 and showing a modification thereof.

As is illustrated in FIG. 4, instead of ribbing or fluting the inner surface of the outer pole 14, the surface of the eccentric ramp cam 20 can be fluted or ribbed on its outwardly presented surface. In a similar manner to the previously described embodiment, upon locking of the mechanism, the roller will progressively ride over the ribs or flutes and become trapped behind one of the ribs or flutes, which then holds the roller 22 against rolling movement relative to the eccentric cam 20.

If desired, both internal ribs or flutes on the outer pole 14, and ribs or flutes on the outer surface of the eccentric ramp cam 20 can be provided in combination to even further improve the security of locking by the locking mechanism.

Figure 5:
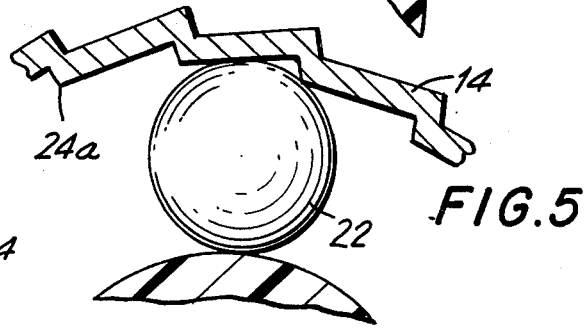
FIGS. 5 and 6 are enlarged fragmentary cross sectional illustrations of alternative forms of flutes and ribbing usable according to the present invention.
Figure 6:
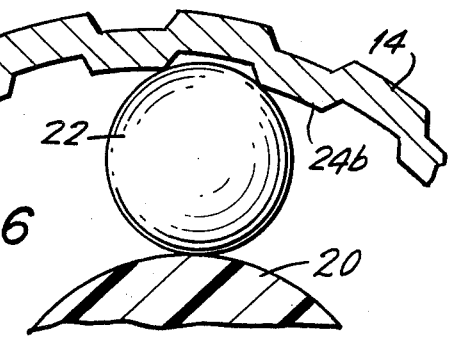

Other forms of ribbing or fluting than that illustrated in FIG. 2 conveniently can be employed, such as ribbing or fluting of substantially saw-tooth form, as illustrated in FIG. 5 at 24a. Upon rotation of the respective poles in the locking direction, the roller 22 is forced to ride up the ramps of the successive saw-tooth configurations and then become trapped behind a rise of the saw-tooth configurations. Alternatively, the ribbing or fluting can be crenellated as illustrated in FIG. 6 at 24b, the depth of the crenellations preferably being greater than the perpendicular bisector of a chord of the roller at the point of engagement by an adjacent pair of ribs or flutes. In this way, the roller 22 is securely held at two circumferentially spaced positions 22a, and is further restrained from rolling movement.

Preferably, and as illustrated in FIG. 1, the outer pole 14 is of slightly greater internal diameter than the external diameter of the locking mechanism 10 and the inner pole 18, to foster resilient deformation of the outer pole 14 under internal loading by the locking mechanism and permit the roller 22 to pass under successive adjacent internal ribs.

While in the embodiments described a single eccentric cam 20 has been employed, it will be appreciated that dual or multiple such eccentric cams may be incorporated into the structure without departing from the scope of the present invention.

It also will be understood that the embodiments described above are preferred embodiments falling within the scope of the appended claims, and, that various modifications can be made without departing from the scope of the present invention as defined in the appended claims.

What is claimed is:

1. In a locking mechanism for telescoped poles of the type including a body having an eccentric cam surface carried along a portion of an inner one of the poles, and a roller movable along the rise of said eccentric cam upon rotational movement of said pole relative to an outer tubular pole in telescoped relation therewith;

the improvement comprising a continuous series of circumferentially spaced axially and radially inwardly extending surface discontinuities on the inner surface of said outer pole and providing abutments resisting rotation of said roller in an unlocking direction of said locking mechanism.

2. The locking mechanism of claim 1, in which said surface discontinuities are radially inwardly and axially extending ribs on the inner surface of said outer tubular pole.

3. The locking mechanism of claim 1, in which said surface discontinuities are radially inwardly and axially extending ribs of saw tooth form on the inner surface of said outer tubular pole.

4. The locking mechanism of claim 1, in which said surface discontinuities are circumferentially spaced, axially extending flutes formed on the inner surface of said outer tubular pole.

5. The locking mechanism of claim 1, in which said surface discontinuities are provided on both of the inner surface of said outer pole and on said eccentric ramp cam.

6. The locking mechanism of claim 1, in which the body of said eccentric cam is formed from a resilient plastics material, the reaction force produced by the roller upon locking of the mechanism acting to indent said surface discontinuities of the outer pole into the surface of the body of the eccentric cam and produce further restraint against unlocking movement of the mechanism.

7. The locking mechanism of claim 1, in which continuous series of circumferentially spaced axially and radially outwardly extending surface discontinuities additionally are provided on the outer surface of said eccentric ramp cam.

8. The locking mechanism of claim 7 in which said surface discontinuities are radially outwardly and axially extending ribs.

* * * * *